March 26, 1957 S. T. HENRIKSSON 2,786,784
PROCESS AND APPARATUS FOR IMPREGNATING WOOD
Filed April 11, 1952 7 Sheets-Sheet 1

BORDERED PIT PAIR

THE TORUS IN MEDIAL POSITION

THE TORUS IS ASPIRATED, THE PIT IS CLOSED

Inventor
Sten T. Henriksson
by Stevens, Davis, Miller & Mosher
his attorneys

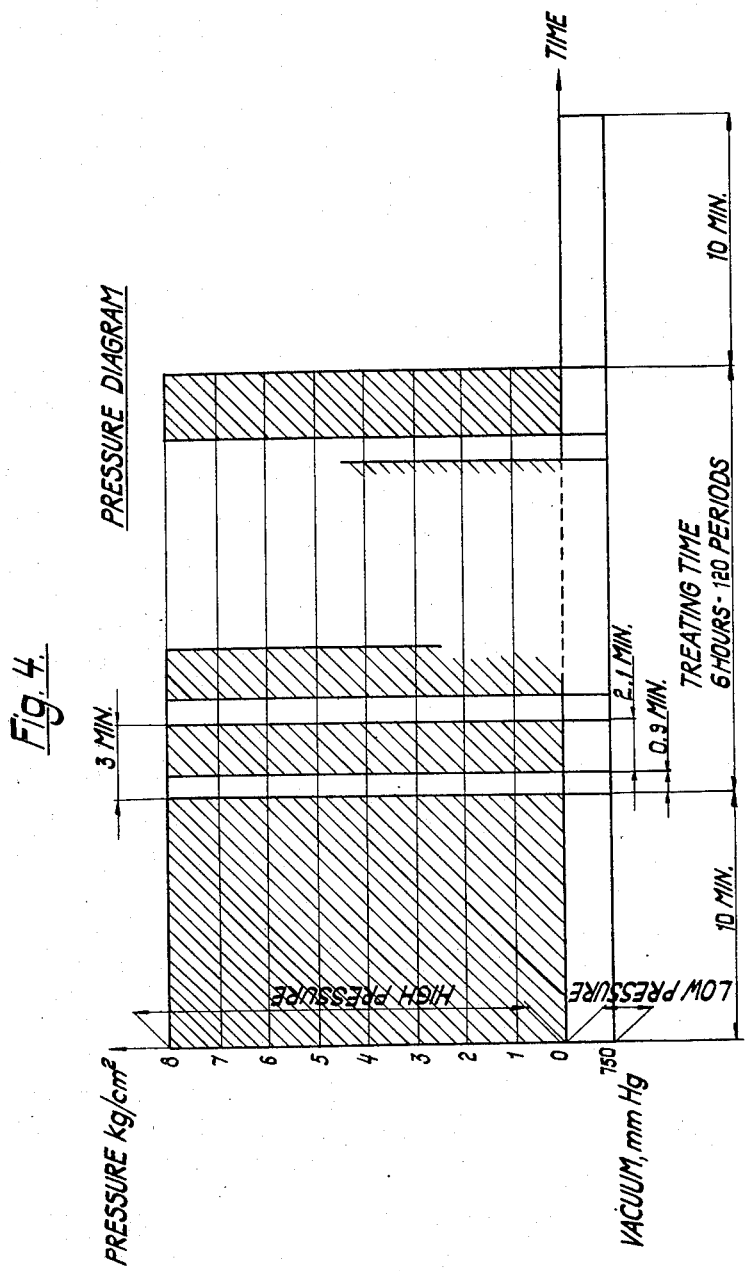

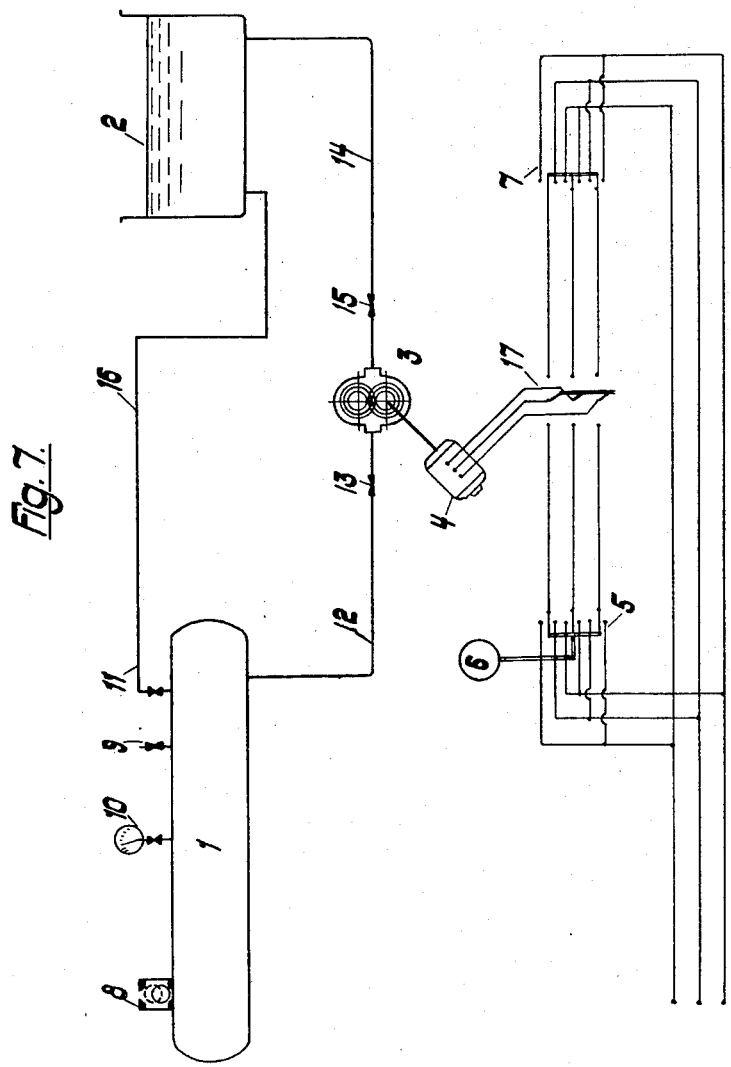

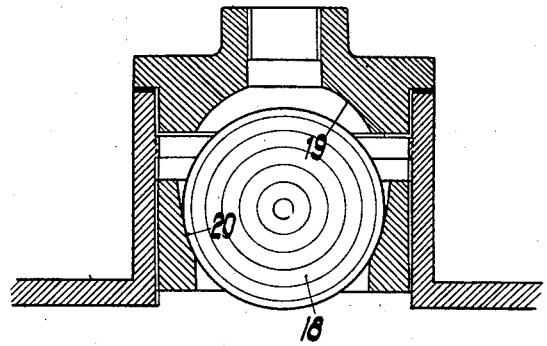
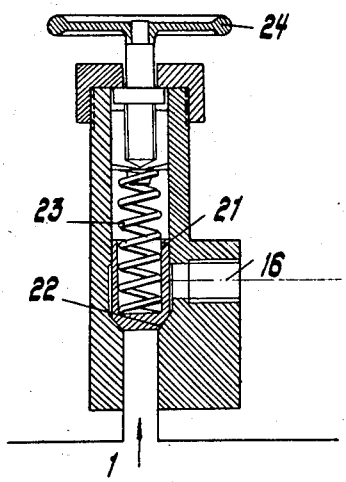

United States Patent Office 2,786,784
Patented Mar. 26, 1957

2,786,784

PROCESS AND APPARATUS FOR IMPREGNATING WOOD

Sten T. Henriksson, Skelleftehamn, Sweden, assignor to Bolidens Gruvaktiebolag, Skelleftehamn, Sweden, a joint-stock company limited of Sweden Application April 11, 1952, Serial No. 281,744

4 Claims. (Cl. 117—116)

The present invention relates to an improved process and apparatus for impregnating wood.

This application is a continuation-in-part of application Serial No. 33,900 filed June 18, 1948, now abandoned, and application Serial No. 100,782, filed June 23, 1949.

When impregnating wood two different methods are used, viz. the full-cell impregnating method and the empty-cell impregnating method. The first one involves that the cells are wholly filled with impregnating liquid, while the latter means that the cells are partly filled only or cell walls coated with impregnating liquid. The present invention relates to full-cell impregnation. In such methods the wood has first been subjected to a vacuum treatment to suck out and remove the air enclosed within the wood, and the impregnating liquid has then been forced into the wood by using pressure. This method can only be used for dried wood which contains no free water in the cells. In case the wood cells contain free water as well as air a special method has been suggested, according to which the wood is first treated with impregnating liquid under pressure. It has been assumed that the solution penetrates the end surfaces of the wood and forces the water and the air before it so that said media are accumulated in a zone in the middle of the wood. The wood is then treated with vacuum when some air and water escape. The wood is then treated again under pressure, and as said zone of air and free water in the middle of the wood now will be less extensive a new portion of the wood will be available to the impregnation liquid. By inclining the impregnating cylinder it is thought possible to displace said zone to make a greater portion of the wood available to the impregnating liquid. The pressure and vacuum treatments should be repeated until the wood is completely impregnated. However, said method has never been successful in practice, but it has been necessary to use the process mentioned above, which process, as stated, can be used for impregnating dried wood only.

By thoroughly studying the properties of the wood and its reactions when treated with impregnating liquid under different conditions the inventor has found it possible to impregnate also moist wood, the impregnation result being not only equivalent but also superior to the conventional methods for treating dry wood. However, the new method can also be utilized for impregnating dry wood or such kinds of wood, which hitherto have been thought impossible to impregnate in practice.

This invention differs principally from the above mentioned known method as to the opinion of which happens within the wood during the impregnation, as well as regarding the carrying out into practice of the impregnation.

According to the invention the introduction of the impregnating liquid into the cells of the wood and the withdrawal of free water and air therefrom are carried out successively and in parallel to each other. Thus, substantially no air and water are being accumulated in the central parts of the wood but water and air are withdrawn from the cells, within which they have been present initially.

When impregnating wood an optimum penetration of impregnating liquid into the wood is aimed at. To obtain this result it is important to know the factors which are determining the penetration and to adapt the treatment thereto. There is a great number of such factors which factors are of different kinds, but particularly the properties of the wood form a factor of great importance. According to the present invention the method of impregnation has been developed with regard to the properties of the wood and particularly with regard to the structional elements of the wood which are called the bordered pit pairs.

For better explaining the invention reference is made to the accompanying drawings in which:

Figure 4 is a pressure diagram exemplifying the new method;

Figure 7 is a diagrammatic view of an impregnation apparatus according to the invention;

Figure 8 shows a section of a float valve used in the impregnation apparatus shown in Figure 7;

Figure 9 shows a section of a pressure control valve included in the apparatus shown in Figure 7;

Figure 1:
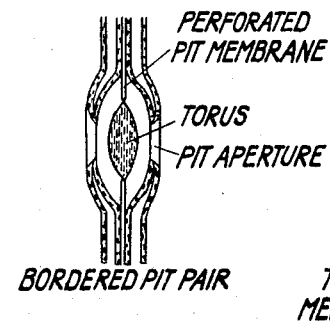
Figure 1 shows a bordered pit pair of the wood.

The pits of the wood are valve resembling openings of which a great number is present in the cell walls of the wood. There are pits of different kinds in the wood. A usual pit, a so-called bordered pit pair, is shown in Figure 1. Said pit pair comprises a membrane having a thick central portion (torus) and two pit apertures, one on each side of the membrane. Outside the torus the membrane has small capillary openings, the membrane openings. The wood contains pits of different sizes, and in the following an example referring to coniferous wood is given. The diameter of the pit aperture is about 7 to 8 microns and the diameter of the membrane is about 20 microns. The diameter of the membrane openings has been estimated to 10–30 millimicrons and the number of openings in a membrane can be assumed to be about 300. The number of pits per cell (tracheid) is varying. A usual value is about 200 pits per tracheid, about 100 pits being distributed on each radial surface of the cell.

Figure 2:
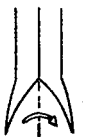
Figure 2 is a diagrammatic section of a bordered pit pair with the torus in medial position.

When the impregnating liquid is forced into the wood by pressure during the impregnation it passes from cell to cell through said pits in the cell walls. Figure 2 shows diagrammatically in which way the liquid passes the pit, it being assumed that the direction of flow is from left to right in said figure. From the adjacent cell to the left (not shown in said figure) the liquid enters trough the left pit aperture, passes the openings of the pit membrane and leaves the cell through the pit aperture to the right. The invention is based upon the following comprehension.

Figure 3:
Figure 3 is the same section as shown in Figure 2 but with the torus engaging one of the pit apertures.

Due to the flow through the capillary membrane openings a pressure will act on the membrane in the direction of said flow. The membrane is elastic and flexible so that it is moved towards the pit aperture (to the right in Figures 2 and 3). When torus has reached said aperture this will be blocked and the flow of solution will be interrupted (Figure 3). In said position a further impregnation with pressure will be ineffective as no further liquid can pass the pits and penetrate further into the wood. To continue the impregnation the pits are to be reopened, that is the membrane has to be moved in the opposite direction (to the left in Figures 2 and 3). The wood to be impregnated contains air of a certain pressure, such as the atmospheric pressure, and in case the wood after a pressure treatment should be subjected to a lower pressure than said air pressure the air will tend to force the liquid in a direction out from the wood. Thus the same course, will be obtained as in the pressure treatment, but in opposite direction thereto. The membrane is moved from the right to the left. Further liquid can then be forced into the wood by pressure and so on.

Accordingly the process of the invention is substantially characterized in maintaining the pressure of the impregnating liquid alternatively higher than the pressure of the air within the wood (high pressure stage) and lower than the pressure of the air within the wood (low pressure stage) respectively.

In all impregnation the main purpose is to introduce the impregnating liquid into the wood as completely and rapidly as possible. As the pits of the wood according to the invention are determining the penetration and said pits are acting as a kind of valves the problem is to obtain as great a flow of liquid as possible through said valves in shortest possible period of time.

It will be understood that the rate of said flow will be dependent on how the pressures are changed. To obtain a maximum effect the high pressure should not be applied for a longer period of time than just to allow the valve to close and the low pressure should be applied only for the time required to open the valve, as the flow of liquid during the low pressure stage will be opposite to the direction of penetration, thus causing a loss of impregnating liquid in the wood. Thus the primary problem is to control the frequency of pressure changes to obtain a maximum resulting rate of flow through the pit valves. Said problem will be discussed in detail in the following.

To facilitate the discussion and to define the treatment the following two terms have been used in the specification and claims.

A "cycle" comprises a low pressure stage and the following high pressure stage. "The ratio within the cycle" is the ratio within each cycle of the duration of the high pressure stage to the duration of said cycle and it is stated in percent.

Figure 6:
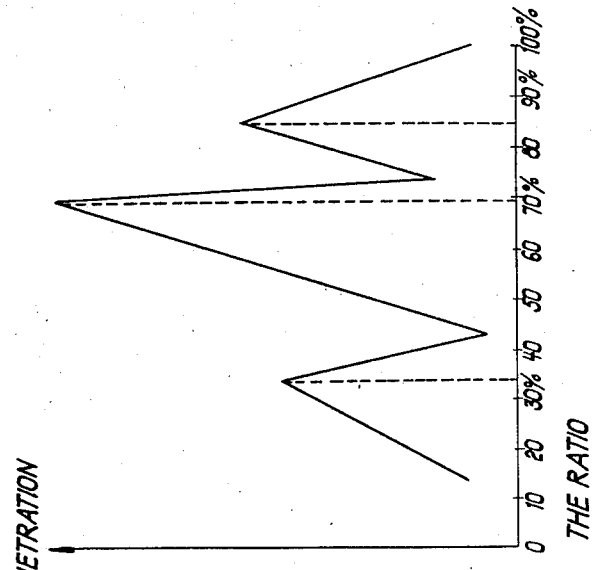
Figure 6 is a diagram obtained by practical tests showing how the penetration into the wood varies with the ratio mentioned in connection with Figure 5.
Figure 5:
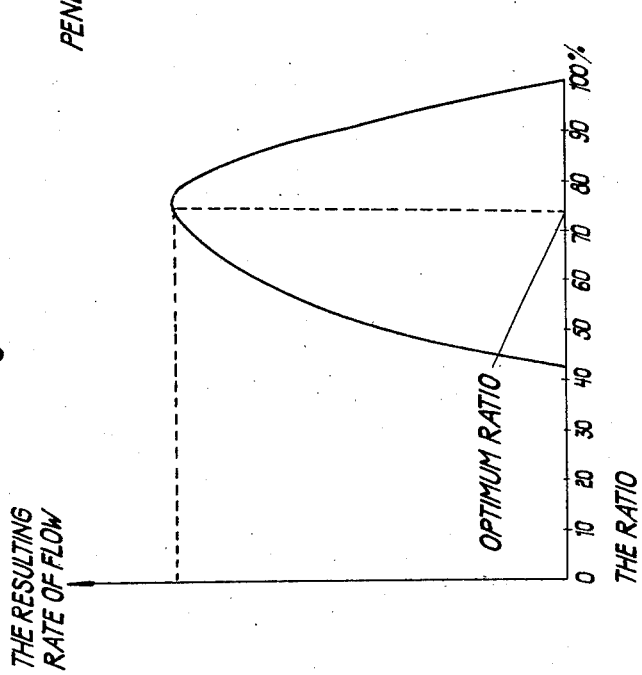
Figure 5 is a calculated diagram showing how the resulting rate of flow of impregnating liquid through a pit is dependent on the "ratio within the cycle" defined in the following.

Theoretically it can be shown that the resulting rate of flow through the pit valve is dependent on said ratio as shown principally in Figure 5. For a certain value of the ratio a maximum resulting rate of flow is obtained. Said value can be determined by experiments by carrying out a series of impregnation tests with different values of the ratio but under similar conditions for the rest. The penetration into the impregnated samples is measured and said penetration is plotted against the ratio to giving curves substantially of the form shown in Figure 6. It will be seen that the ratio should be within a range from about 10% to about 95%, and particularly good results have been obtained for three different values of the ratio, viz at 30–40%, 65–75%, and 80–90%.

When impregnating wood in practice the ratio should be selected within said ranges. Also different variations and combinations of said values can be used.

In a corresponding way also the most suitable value of the duration of the cycle can be determined by experiments. A series of impregnation tests are carried out with different values of the duration of the cycle but under similar conditions for the rest. The penetration is measured and plotted against the duration of the cycle. It has been found that a duration of the cycle within a range from about 10 seconds to about 10 minutes gives the best result.

The total duration of the impregnation corresponding to the total number of cycles, should be adapted to the sizes of the wood to be impregnated and to the penetration desired. When impregnating wood in practice the inventor prefers to use at least five cycles and usually the number of cycles will be of the order of 100–500.

Figure 4 is a pressure diagram exemplifying the impregnation process according to the invention. 3 minutes and 70% have been selected in this case as suitable values of the duration of cycle and of the ratio respectively. The number of periods is 120 corresponding to 6 hours. The high pressure is 9 kg./cm.$^2$ absolute pressure and the low pressure is near about 0 kg./cm.$^2$ absolute pressure (about 750 mm. Hg vacuum). The pressure of the air within the wood was in this case about 1 kg./cm.$^2$ absolute pressure. Before the impregnation with pressure changes a pre-treatment with high pressure was carried out during 10 minutes. The purpose of said treatment is to trap the air within the surface wood layers to prevent an unduly high air escape at the start of the pressure change treatment. The impregnation is terminated by a post treatment with vacuum in order to remove any excess of impregnating liquid in the outer parts of the wood.

The example described above can be said to be representative for the most simple form for carrying out the impregnation with pressure changes in practice. However the method has been further developed to give somewhat higher effect. As stated above the pressure drop over the pit membrane causes the movements in the pit valves. Thus the extent of said pressure drop should also determine the rapidity of said movements and accordingly also the ratio and the duration of cycle. However said pressure drop will depend upon the depth into which the impregnating liquid has penetrated the wood and this fact involves that the ratio within the cycle as well as the duration of the cycle should be varied in a certain manner during the impregnation. Thus the further development of the new process will require a determination of the rules for varying said factors.

Tracheids and wood rays of moist wood contain free water or rather a diluted aqueous solution of certain organic substances, as well as air. Also the freshly cut wood contains some air, often about 10 to 20% of the void volume of the cells.

Figure 12:
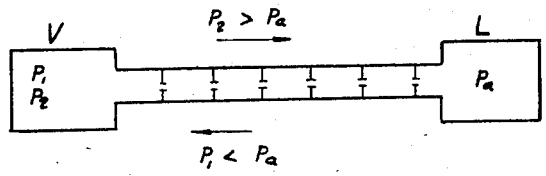
Figure 12 shows the pressures and the flow of liquid during the impregnation.

The ways of penetration within the wood (tracheids and wood rays) can be illustrated diagrammatically by a pipe line having transversal walls (pits) containing very fine capillary openings (Fig.-12). In case said pipe line is passed by a flow of liquid the pressure drops will be substantially located to said transversal walls.

Said pipe line connects a vessel V corresponding to the liquid-filled space surrounding the wood in the impregnating vessel to a vessel L corresponding to the space of air within the wood. The liquid pressure within the impregnating vessel is $P_1$ at the low pressure stage and $P_2$ at the high pressure stage. The pressure of the air within the wood is $P_a$. The number of the walls passed by the liquid has been designated $n$. Further the openings in the walls are considerably smaller than the diameter of the pipe. At the high pressure stage ($P_2 > P_a$) the pressure drop over each wall will be $$\frac{P_2 - P_a}{n}$$

$n$ can be said to be a measure of the penetration into the wood and thus the pressure drop will be inverted proportional to penetration. At the low pressure stage the pressure drop over each wall will be $$\frac{P_a - P_1}{n}$$

the pressure drop being inversed proportional to the penetration also in this case.

Figure 11:
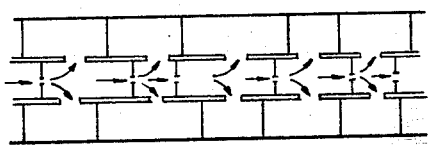
Figure 11 shows in a diagrammatic way the penetration of impregnating liquid into the wood during the impregnation.

Fig. 11 shows diagrammatically a wood element including a wood ray and on each side thereof tracheids which are connected to the said wood ray by means of pits. When the pressure $P_2$ ($P_2 > P_a$) is maintained in the impregnating vessel this will result in a flow of liquid as shown in Fig. 11. The liquid will enter the wood ray and then the adjacent tracheids. The velocity of flow through the tracheid pits is dependent on the pressure drop thereover. The velocity will be higher the greater being the pressure drop. The greatest pressure drop occurs in the first (outer most) tracheid row, somewhat less for the next one and so on being gradually decreased towards the center of the wood. Thus the flow is most rapid in the first tracheid row and then decreases for each further tracheid row. A similar condition applies to the out flow, that is when the pressure $P_1$ ($P_1 < P_a$) is maintained in the impregnating vessel. Also in such a case the pressure drop and the outflow are greatest over the first tracheid row and then gradually decreased inwardly. At the pressure $P_1$ water, impregnating liquid and air in form of fine bubbles will leave the tracheid. After a number of pressure changes the tracheids will have been progressively freed from air and water which media have been substituted completely by impregnating liquid. This condition is first obtained in the outermost tracheids, as the movements of liquid have been greatest there. When a tracheid has been completely filled with liquid it no longer takes part in the impregnation course (in this connection the vapor pressure of the liquid can be disregarded). The liquid in the wood rays passes by said trachids and is instead thereof engaged by tracheids located deeper within the wood. Thus the course of impregnation is characterized by the fact that the tracheids are filled with impregnating liquid successively, the outermost tracheids being filled first. The result will be that the free water and air in the cell lumen are removed and the cell filled with impregnating liquid. The sapwood is obtained in liquid saturated condition and the free water of the wood has substantially left into the impregnating liquid having surrounded the wood.

When the impregnating liquid penetrates the wood it will thus pass pits in the transversal walls of the wood rays as well as in the walls between the wood rays and the tracheids. How the liquid passes the pits has been described above in connection with Figs. 2 and 3. The distance between torus in an actual position and in its medial position is designated $x$ and the distance between the medial position and one pit aperture has been designated $a$. Two forces will act on the torus. One force $P$ derives from the pressure drop over the pit membrane. The other force derives from the elasticity of the membrane. Said force always tends to restore the torus into its medial position and said force can be assumed to be directly proportional to the distance from the medial position.

According to the second law of Newton, the acceleration is proportional to the sum of the acting forces. To the movements of torus the following equation is applicable:

$$\ddot{x} = -A.x + B.P$$

where $A$ and $B$ are constants.

The pit closing pressure (the pressure just necessary for balancing the "elasticity" force and to move the torus against the aperture) is called $P_0$. Then $$-A.a + B.P_0 = 0$$

$$\ddot{x} = A\left(-x + a \cdot \frac{P}{P_0}\right)$$

For greater simplicity the symbols are changed:

$$T = t\sqrt{a}$$

$$\zeta = \frac{x}{a}$$

$$Q = \frac{P}{P_0}$$

The equation can then be simplified to $\ddot{\zeta} + \zeta = Q$ and the solution will be $$\zeta = b.\cos(T + d) + Q$$

where $d$ and $b$ are constants. This is the fundamental equation for the movements of the torus.

Now it is searched for how the pressures ought to be variated during the treatment to obtain the maximum resulting rate of flow through the pit valve.

The following condition is considered. At the end of a high pressure stage torus is at the right aperture of the pit. The pressure in the impregnating vessel is changed to the low pressure and torus is then moving in the direction to the left aperture. Due to the pressure drop over the membrane the force $-Q$ will act on torus. After a period of time $T_1$ change to the high pressure is carried out and due to the pressure drop the force $+K.Q (K.Q > 1)$ will act on torus. The torus turns and reaches the right aperture after a further period of time $T_2$.

From the first part of the movement (the low pressure stage) is obtained:

(1) $\quad \zeta = (Q+1).\cos T_1 - Q$ and from the other part of the movement (the high pressure stage)

(2) $\quad (Q+1)\cos(T_1+T_2) - (K+1).Q.\cos T_2 = 1 - K.Q$

The total duration of the low pressure stage $T_1$ and the high pressure stage $T_2$ comprises one cycle ($\varphi$).

The amount of liquid passing the pit valve during a cycle is proportional to $K.Q.T_2 - Q.T_1$. The rate of flow per unit of time will then be proportional to $$\frac{K.Q.T_2 - Q.T_1}{T_1 + T_2}$$

Said expression can be transformed into (3) $\quad Q.\left[(K+1)\dfrac{T_2}{T_1 + T_2} - 1\right]$ Thus, $T_1$ should be small to give a great rate of flow. Due to said fact also $\varphi$ is to be small.

The Equation 2 above can also be written:

$$\sin \frac{\varphi}{2} = \sqrt{\frac{Q(K+1)}{Q+1}} \cdot \sin \frac{T_2}{2}$$

By the condition that $\varphi$ should be small the following equation is obtained:

$$\lim_{\varphi \to 0} \frac{\sin \frac{T_2}{2}}{\sin \frac{\varphi}{2}} = \frac{T_2}{\varphi} = \frac{T_2}{T_1 + T_2}$$

$$\frac{T_2}{\varphi}$$

is the ratio within the cycle and has been designated $F$. It states the ratio of the duration of the high pressure step to the duration of the cycle. To obtain a maximum resulting rate of flow the equation for F should be (4) $$F=\sqrt{\frac{Q+1}{Q(K+1)}}$$

The velocity of penetration of the impregnating liquid into the wood can be designated $$\frac{dn}{dt}$$

Said velocity is directly proportional to the rate of flow through the pits according to the Equation 3. This will give (5) $$\frac{dn}{dt}=c.Q[(K+1).F-1]$$

where $c$ is a constant (penetration constant) and a material constant depending upon the properties of the pits and the impregnating liquid.

By inserting the pressure drop over the pit membrane into the expression for the force Q it is obtained $$Q=\frac{P}{P_0}=\frac{P_a-P_1}{n.P_0}$$

Equation 4 then gives (6) $$F^2=\frac{1}{K+1}\left(1+\frac{n.P_0}{P_a-P_1}\right)$$

and $$dn=\frac{P_a-P_1}{P_0}(K+1).2F.dF$$

Said expression is inserted into the Equation 5 and Q is eliminated by the Equation 4, which will give $$c.\frac{P_0}{P_a-P_1}.\frac{1}{K+1}.dt=\frac{(K+1).F^2-1}{(K+1).F-1}.2F.dF$$

Said equation is integrated to:

(7)
$$c\frac{P_0}{P_a-P_1}\cdot\frac{1}{K+1}\cdot t=\frac{2F^3}{3}+\frac{F^2}{K+1}-\frac{2K.F}{(K+1)_2}-\frac{2K}{(K+1)^3}\cdot\ln[(K+1)\cdot F-1]+C$$

This is the general equation for the variation of the ratio F with the time of impregnation $t$ to obtain an optimum impregnation result. The integration constant C is determined by the condition that when $t=0$ also $n=0$ and by the Equation 6

$$F=\frac{1}{\sqrt{K+1}}$$

From the above mentioned equation it can also be found how the pressures are to be selected to give the optimum impregnation result. Equation 5 can be written (8) $$\frac{dn}{dt}=c\cdot[\sqrt{(K+1)\cdot(Q^2+Q)}-Q]$$

To give a maximum of penetration velocity $$\frac{dn}{dt}$$

K and Q should apparently be great. After insertion of the different pressures K and Q can be written:

(9) $$K=\frac{P_2-P_a}{P_a-P_1}$$

(10) $$Q=\frac{P_a-P_1}{n.P_0}$$

To give a great Q a low liquid pressure in the impregnating vessel should be aimed at during the low pressure stage. Apparently the liquid pressure in the impregnating vessel should be high during the high pressure stage to give a great K.

The lowest possible $P_1$ is $P_1=0$ (when disregarded from the vapor pressure of the impregnation liquid or the steam pressure of the water). Equation 8 can then be written:

(11) $$\frac{dn}{dt}=\frac{c}{n\cdot P_0}\cdot[\sqrt{P_2(P_a+n\cdot P_0)}-P_a]$$

The pressure of the air within the wood $P_a$ to give always a maximum velocity of penetration $$\frac{dn}{dt}$$

is calculated therefrom. It is obtained

(12) $$P_a=\frac{P_2}{4}-n\cdot P_0$$

Thus, the pressure of the air within the wood should not be greater than ¼ of the high pressure in the impregnating vessel.

The pressure of the air within the wood is usually about 1 kg./cm.². It is possible to increase $P_a$ by treating the wood with compressed air, before the proper impregnation. Another possibility is to heat the wood (by the impregnating liquid), which results in an increase of $P_a$ due to the increased steam pressure within the cells of the wood. The inventor's experiments show that both said methods improve the impregnation to a certain extent.

When carrying out the impregnation in practice the pressures often are:

$P_2=9$ kg./cm.² absolute pressure
$P_a=1$ kg./cm.² absolute pressure
$P_1=0.08$ kg./cm.² absolute pressure (corresponding to a vacuum of about 700 mm. Hg).

The value of K is calculated from Equation 9 and then inserted into Equation 7. For the variation of the ratio within the cycle it is then obtained in this case:

(13) $$c.P_0.t=6.7F^3+F^2-1.8F-0.4\log(10F-1)+0.4$$

The variation of the duration of a cycle $\varphi$ can be calculated in the following manner:

It has been shown above that $T_1$ (the duration of the low pressure stage) and also $\varphi$ should be as small as possible to give a maximum velocity of penetration. $T_1$ being small also the distance $(1-\zeta)$, through which torus is moving during the low pressure stage, should be small. The lowest value of said distance, which is possible to obtain in practice with regard to the impregnating apparatus (the shortest possible duration of the low pressure stage) and with regard to the natural inertia of the reactions in the wood, should be maintained constant during the impregnation to give an optimum result. Thus $\zeta$ should be constant.

For the movements of the torus during the low pressure stage the Equation 1 is valid:

$$\zeta=(Q+1)\cos T_1-Q$$

According to the definition given above $T_2=\varphi(1-F)$. From the condition that $\varphi$ should be small it is obtained:

(14) $$\frac{\varphi(1-F)}{2}=\sqrt{\frac{1}{2}\cdot\frac{1-\zeta}{Q+1}}$$

At the start of the impregnation $(n=1)$ are:

$$F=F_0$$

$$\varphi=\varphi_0$$

$$Q=\frac{P_a-P_1}{P_0}$$

By inserting those values into Equation 14 it is obtained:

$$\zeta=1-\left(\frac{P_a-P_1}{P_0}+1\right)\frac{1}{2}\cdot\varphi_0^2(1-\varphi_0)^2$$

Said value of ζ is inserted into Equation 14, which gives:

$$(15) \quad \varphi = \varphi_0 \frac{1-F_0}{1-F} \cdot \sqrt{\frac{(P_a - P_1 + P_0) \cdot n}{P_a - P_1 + n \cdot P_0}}$$

This is the general equation for the variation of $\varphi$. When treating wood containing air of atmospheric pressure and when using the greatest possible vacuum in the impregnating vessel ($P_a = 1$ kg./cm.$^2$ and $P_1 = 0$ kg./cm.$^2$ absolute pressure) one can redraw Equation 15 to read:

$$(16) \quad \varphi = \varphi_0 \cdot \frac{1-F_0}{1-F} \cdot \sqrt{\frac{n \cdot P_0 + n}{n \cdot P_0 + 1}}$$

The total time of impregnation for a certain penetration $n$ can be calculated in the following way. From the Equation 6

$$F^2 = \frac{1}{K+1}\left(1 + \frac{n \cdot P_0}{P_a - P_1}\right)$$

the ratio F of the last cycle of said penetration is calculated. This value of F is inserted into Equation 7, which gives the shortest possible time of impregnation to give a certain penetration $n$. In the practical example stated above the Equation 6 will be simplified into:

$$(17) \quad n = \frac{10F^2 - 1}{P_0}$$

A process of impregnation of wood with pressure changes as defined by the general Equations 6, 7, 8, 12 and 15 stated above. Thus said equations show how a desired impregnation should be carried out in a minimum of time. The following general rules are obtained: The ratio within the cycle and the duration of the cycle should be successively increased by starting the impregnation with the lowest value and terminating it with the highest value.

The low pressure in the impregnation vessel is to be held as low as possible (as great a vacuum as possible), the high pressure should be held as high as possible and the pressure of the air within the wood should not be higher than ¼ of the high pressure.

The duration of the impregnation is selected to give the desired penetration $n$.

The carrying out of the impregnation in practice will be dependent upon the values of the constants included in the formulae. The values of the high and low pressure are determined by the capability of the impregnating apparatus. The values of the pit closing pressure $P_0$ and the penetration constant $c$ should be determined by experiments. The pit closing pressure can for example be determined by testing at which pressure the flow of liquid through the wood, which normally is increasing when the pressure increases, shows a sudden drop. Different methods can be used and have been described in the literature of this field.

The following example is given to show how an impregnation program according to the invention is determined.

Figure 13:
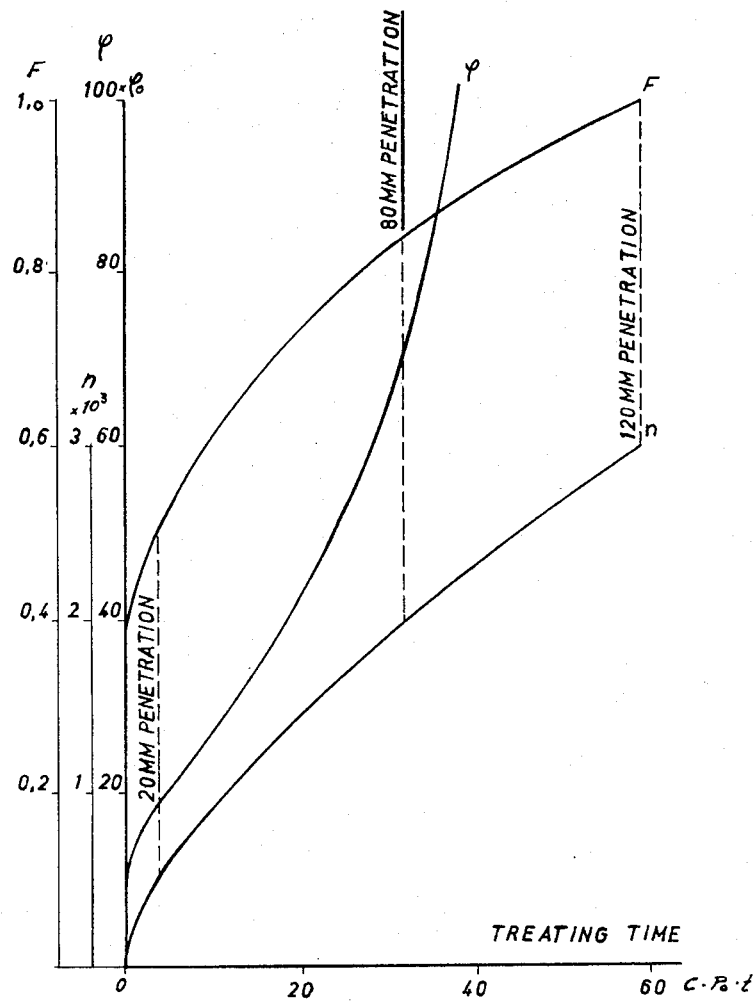
Figure 13 shows an example of how to determine an impregnation program according to the invention.

It is assumed that the high pressure in the impregnation vessel is 9 kg./cm.$^2$ absolute pressure, the pressure of the air within the wood is equal to the atmospheric pressure and the low pressure in the impregnation vessel corresponds to high vacuum as stated above. $P_0$ has been determined to about $3 \cdot 10^{-3}$ kg./cm.$^2$. The Equations 13, 16 and 17 are then applicable to determine the ratio within the cycle, the duration of the cycle and the penetration. By means of said three equations the diagram shown in Fig. 13 has been drawn. Said diagram shows how F, $\varphi$ and $n$ are varying with the treating time of impregnation.

It is found that F should be about 30% at the start of the impregnation. The final value of F is determined by the penetration desired, which in its turn is dependent on the size of the wood being treated. The diagram shows that $n = 3 \cdot 10^3$ when $F = 100\%$ (high pressure only).

As a common value of the radial width of the cells of the radial width of the cells of the wood is about 0.04 mm., said value of $n$ corresponds to a radial penetration of 120 mm. At said point the pits will cease to act as valves. Thus to enable a further penetration the wood should be impregnated with high pressure only. However, wood having such a great radial width is very rare in practice. Usually the width of the sapwood lies within the range of 20–80 mm., and according to the diagram the final value of F will then be 50–84%.

The duration of the first cycle ($\varphi_0$) of the treatment is determined by the capability of the impregnating apparatus, viz. how rapidly the pressures can be changed. According to the statements given above $\varphi_0$ should be as small as possible. The practical limit value seems to be about 0.1 minute. For example the diagram shows that for a penetration of 80 mm. the final value of $\varphi$ should be equal to $74\varphi_0$, which corresponds to about 7.4 min.

The total treating time is determined by practical experiments. A series of impregnations is carried out with programs, which have been calculated by using a certain value of the penetration $n$ but different values of the treating time ($c \cdot P_0 \cdot t$). The penetration is then measured in the samples, from which can be determined the treating time giving the best conformity between the real penetration and the penetration calculated from said program.

The inventor has carried out a great number of practical experiments. The following data are based on said experiments and can be given as rules for carrying out the invention in practice. Said data primarily relate to pine wood and spruce wood.

| | Duration of impregnation, Hours | Ratio within the cycle, percent | Duration of the cycle, minutes | Total number of cycles | Penetration, mm. |
|---|---|---|---|---|---|
| Poles and sawn timber of great sizes | 20 | 30–85 | 1–8 | 400–500 | 80 |
| Railway ties | 10 | 30–70 | 1–4 | 250–300 | 50 |
| Sawn timber of usual sizes | 5 | 30–60 | 1–3 | 150–200 | 30 |

The penetration constant $c$ is a material constant for the wood and impregnating liquid. In $c$ the capillary data of the pit membrane and the viscosity and the tendency of the liquid to be absorbed by the wood are included. From the experimental results described above (Fig. 6) the inventor has drawn the conclusion that the constant $c \cdot P_0$ has three different values in wood. It is known that the wood contains pits of varying sizes. Said pits statistically can be referred to three different size groups, a certain value of the constant $c \cdot P_0$ being valid for each group and being different to the constants of the other groups. The deduction of the impregnation program shown above will thus involve a simplifying by using only one value of the constant $c \cdot P_0$. Thus the wood is considered homogeneous with regard to the sizes of the pits. The practical experiences show that such a simplifying is possible and does not prevent obtaining a satisfactory result of the impregnation. Furthermore it is thought difficult to carry out in practice a program in said developed form, in which regard also has been taken to different values of $c \cdot P_0$.

In the above deduction regard has not been taken to the variations in the moisture content of the wood to be treated. When the moisture content is increasing, also the amount of free water in the cell lumina to be removed in the impregnation is increasing. Therefore the duration of the low pressure stage should be increased, viz. lower values of the ratio within the cycle F are to be used compared with the above stated theoretical values. The practical experiences show that when treating very moist wood it may be suitable to reduce F with up to 10% compared with the theoretical values stated above.

As stated above the practical performance of the impregnation is greatly dependent upon the constructional and economical factors applicable to the impregnating apparatus. Due to said reason in practice the high pressure can seldom be held higher than about 18 kg./cm.$^2$ absolute pressure and the low pressure cannot be lower than about 0.03 kg./cm.$^2$ absolute pressure. Furthermore the low pressure cannot be lower than the vapor pressure of the impregnating liquid used. The pressure of the air within the wood before the impregnation is about 1 kg./cm.$^2$ absolute pressure in case no special steps have been taken. Said value can be increased by treating the wood with compressed air before the impregnation, which may improve the impregnation result. A similar effect can be obtained by heating the wood and the impregnating liquid, advantage being gained by the increased vapor pressure in the wood. The duration of the cycle should be as short as possible at the start of the impregnation. Said value is determined by the pump means of the apparatus. In practice about 1 minute is considered a normal value for great impregnating apparatus. A considerably shorter time would require an unduly great and expensive pump equipment. Furthermore according to Fig. 13 the value of $\varphi$ will increase very rapidly during the first part of the impregnation so that an approximation of $\varphi$ to about 1 minute during said introductive part does not involve any great disadvantages.

Impregnation with pressure changes is especially suitable for treating wood having high moisture contents. Probably this depends on the fact that the pit membranes are more movable in such a case and on the whole they are of greater importance as to the penetration when impregnating moist wood (over the fibre saturation point) than when impregnating dry wood. Below the fibre saturation point the pits cease to act as valves due to processes associated with the drying of the wood. Then it is natural that said method which especially is based on a valve action of the pits will give a better result when impregnating moist wood. The moisture content of the wood may lie above the fibre saturation point (about 25% moisture) and up to about 100% or higher, that is substantially water saturated wood such as timber freshly cut or floated timber.

Over conventional impregnation methods the impregnation with pressure changes according to the invention has the great practical advantage of eliminating the necessity of drying the wood before the impregnation, so that wood can be treated also in freshly cut condition. Furthermore such kinds of wood as e. g. spruce can be impregnated, which normally is considered difficult to treat by the usual vacuum pressure process or the so called Rüping process. Furthermore impregnation with pressure changes seems to give a better penetration into the heart wood. Said wood, however, also when using the method according to the invention is resistant to impregnation.

Water solutions, oils, emulsions or similar materials can be used as the impregnating liquid.

The process and apparatus of the invention can be used for impregnating wood for wood preservation, colour impregnation, fireproof treatment, synthetic resin treatment and on the whole when it is desired to introduce foreign matter into the wood without detrimenting the wood structure.

As mentioned above the invention also comprises an apparatus particularly adapted for carrying out impregnation with pressure changes. An apparatus for the performance of such an impregnation must have such properties that the pressure changes can be carried out completely automatically and so that the frequency of the changes can be varied and the air, exiting the wood at the low pressure stages, automatically can be removed from the impregnating vessel. Furthermore it is required that the changes between the high and low pressures should be carried out very rapidly.

An apparatus according to the invention is diagrammatically shown in Fig. 7. It consists in an impregnating vessel 1, usually a cylinder, a storage tank 2 for impregnating liquid and a liquid pump 3, which is reversible such as a gear pump. The pump is driven by an electric motor 4, operable by an automatic current reverser 5 with an impulse generator 6 or by a manually actuated current reverser 7. The impregnating vessel has an automatically working valve 8, a usual isolating valve 9 to the atmosphere and a vacuum pressure gauge 10. The pump is connected to the impregnating vessel by means of a pipe line 12 provided with an isolating valve 13 and to the storage tank by a pipe line 14 provided with an isolating valve 15. A pressure control valve 11 on the cylinder is connected to the storage tank by means of a pipe line 16.

The direction of rotation of the pump motor is reversed in the usual manner by changing two of the current leading phases to the primary winding of the motor. This is carried out in the current reverser 7 by manual operation or in the current reverser 5 automatically due to impulses from the generator 6. By means of the switches 17 either the manually or the automatically working operation can be selected. The automatical current reverser may be of a common type having two groups of contactors provided with magnets. The magnets are fed alternatively with current through the impulse generator, said contactors being alternatively closed and the motor caused to rotate in one or the other direction.

An embodiment of the automatic valve 8 is shown in Fig. 8. It consists of a ball 18, such as a rubber or plastic covered cork ball of a buoyancy to make it float in the impregnating liquid to be used, and one upper, 19 and one lower, 20, sealing surface which surfaces preferably are spherically shaped.

The pressure control valve 11 is shown in Fig. 9. It is of a common type comprising a valve sealing 21 actuated by a compression spring 23. The high pressure in the impregnating vessel may be controlled by means of an adjustable hand screw 24 tensioning the spring in any desired position.

The pipe line 16 from the valve 11 is suitably connected to the bottom of the storage tank 2, so it is sure that no air can enter the impregnating vessel through the valve 11 during the low pressure stage.

The device is used in the following manner.

The wood is introduced into the impregnating vessel 1, which then is closed. The valves 13 and 15 are opened. The manually working current reverser 7 is made effective by means of the switches 17 and the pump is started so that liquid flows from the storage tank 2 to the cylinder 1 through the pipe lines 12 and 14. When the impregnating vessel is being filled air exits through the valve 8, the flow of air raising the float ball from the lower sealing surface to enable the passage of air through the valve. When the impregnating vessel has been completely filled, liquid will enter the valve 8 to raise the float ball towards the upper sealing surface so that it is pressed thereto to prevent the passage of liquid, the valve admitting the outlet of air but not of liquid. The pressure increases rapidly in the cylinder to the value for which the valve 11 has been adjusted. When said pressure has been reached, the valve opens and liquid can pass through the pipe line 16 to the storage tank. The impregnating liquid will now be circulated via the impregnating vessel and the storage tank while the pressure in the vessel is maintained constant at the pressure adjusted on the control valve.

When the cylinder has been filled with liquid the proper impregnation will take place. As an example it is assumed that said impregnation is carried out according to the pressure diagram shown in Fig. 4. The control valve is then to be adjusted for the high pressure 9 kg./cm.² absolute pressure. By means of the switches 17 automatical operation is selected. The impulse generator 6 switches in the automatic current reverser 5 so that the pump will draw liquid from the storage tank to the impregnating vessel. The high pressure in said vessel should act during 10 minutes (the pre-treatment) and the impulse generator will then change the current reverser to reverse the pumping direction. The liquid will now flow from the impregnating vessel 1 through the pump into the storage tank 2. When the pressure in the cylinder ceases, the valve 11 is closed and the liquid cannot enter the cylinder through the line 16. When the liquid level in the impregnating vessel sinks, the float ball in valve 8 will be carried downwardly to seal against the lower sealing surface due to the fact that when air being hindered to enter through the valve 8 vacuum will be formed momentaneously in the impregnating vessel to cause the ball to be forced against the lower sealing surface by the atmospheric pressure. The movements in the valves 8 and 11 are taken place immediately upon the reversing of the pump while simultaneously the indicator 10 will show vacuum. The low pressure stage during the first cycle will then act during 0.9 minute, the impulse generator having been adjusted for said period of time. The change from low pressure to high pressure will then take place in an analogous manner by the reversing of the pump, the cylinder will be filled and the valve 11 will be opened when the pressure has raised to 9 kg./cm.² absolute pressure. The high pressure will act during 2.1 minutes, the pump then being reversed again. The first cycle of 3 minutes of the treatment is now complete. Said course is repeated 119 times. After the last high pressure step the pump is reversed again and is then allowed to run for 10 minutes (final-vacuum). The automatical operation is turned off by the switches 17 and the proper impregnation is terminated. To let the impregnating liquid out of the impregnating vessel the valve 9 is opened so that air can enter the vessel. The manually operating reverser 7 is made effective by the switches 17 so that the liquid returns from the impregnating vessel through the pump to the storage tank 2. The valves 13 and 15 are used to cut off the pump from impregnating liquid when desired.

During the low pressure stage air and water are withdrawn from the wood. The impregnating vessel is usually not completely emptied but only to a low degree. The air is accumulated above the liquid level in the vessel and after the reversing of the pump said air is compressed and is then exiting the vessel through the valve 8, when the pressure within the vessel has been increased to the same pressure as the atmospheric pressure outside the vessel. The water from the wood is mixed with the impregnating liquid.

To obtain an optimum effect of the treatment it is necessary to carry out the changes between the high and low pressures very rapidly. In practice said change should be carried out within a period of a few seconds, the capability of the pump in relation to the flows of air and liquid within the wood being of essential importance in this connection.

During the low pressure stage air and water are withdrawn from the wood. To enable the pump to form a low pressure in the vessel the pump must have such a suction capacity that it can remove from the cylinder a volume of liquid at least corresponding to the amount of water and the volume of air which are forced out of the wood at the said pressure. Analogously at the high pressure it is required that the pump has such a capacity at least to correspond to the amount of liquid penetrating into the wood under said pressure. According to practical experience the capacity of the pump should suitably be 30–50 litre per minute and M.³ of wood to enable satisfactorily rapid changes.

Often the indications of the vacuum-pressure gauge and the reversing of the pump do not correspond, but the low pressure stage is longer and the high pressure stage shorter than corresponding to the running time of the pump in the direction impregnating vessel to storage container and storage container to impregnating vessel respectively. It will then be necessary to adjust the impulse generator to have the pressure changes in the impregnating vessel to correspond to the impregnating program calculated.

It will be understood from the foregoing that most of the wood is surrounded by liquid during the low pressure stage. This fact, however, does not seem substantially to prevent the air from being removed from the wood. The increased resistance corresponds to the weight of the liquid column, which only is some tenths of mm. Hg. Said air cannot leave the cylinder until the pressure is equal to the atmospheric pressure. It would then be a risk that the air would have possibility to reenter the wood. However, the inventor's practical experiences have shown that this only takes place to a very small degree, depending upon the fact that the impregnating vessel is being filled relatively rapidly, so that only small amounts of air have time to enter the wood, and also due to the fact that the liquid substantially protects the wood from air.

Figure 14:
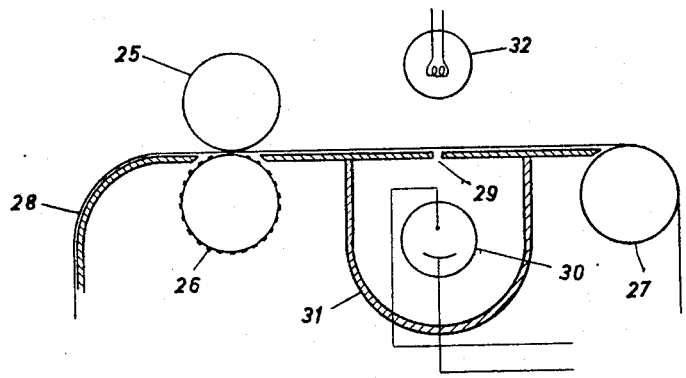
Figure 14 shows diagrammatically an impulse generator included in the electric control means of the impregnating apparatus shown in Figure 7.

As mentioned above it is necessary that the apparatus includes an effectively working impulse generator. Such a generator is shown in Fig. 14. In said generator the impregnating program is represented by alternatingly transparent (light) and opaque (dark) sections of a film web. For example the light sections correspond to the low pressure stages in the impregnating vessel and the dark sections to the high pressure stages.

According to Fig. 14 in a frame not shown a roller 27 is mounted over which roller the film 28 can be fed, e. g. from the right to the left in the drawing. The film then passes a gap 29 and between two additional rollers 25 and 26, of which the lower one 26 can be a toothed feed roller, the perforation of the film being utilized for transporting the film in the usual manner. Below the gap 29 the photocell 30 is mounted in a cover 31. 32 designates a light source, from which light can project through the film 28 and the gap 29 towards the photocells 30, which is protected from other light by means of the cover 31.

The impulses from the photo cell are received by an amplifier e. g. an amplifier including a thyratron valve and a relay, which then directs the automatic current reverser 5 (Fig. 7). The light and the dark sections correspond to the two directions of rotation of the electric pump motor. The device may be used e. g. in the following manner.

It is assumed that the film is moving to the left in Fig. 14. When a light section of the film is passing the gap the photocell receives light from the light source 32 and will then generate an impulse, which is amplified and which switches in the current reverser, so that the pump pumps impregnating liquid out from the impregnating vessel. This condition corresponds to the low pressure stage. When the light section has passed the gap 29, the light beam will be cut off so that the impulse from the photo-cell ceases. By means of a relay the current reverser is reversed and the pump rotates in opposite direction. This condition corresponds to the high pressure stage. The total length of a light section and the succeeding dark section of the film corresponds to the duration of the cycle and the ratio between a light section and the succeeding dark section determines the ratio within the cycle. The number of cycles corresponding to the total impregnation time, is determined by the length of the film web. The film web may usually be made endless so that the impulse generator is ready to start the following impregnation as soon as the foregoing impregnation has been completed, rewinding of the film being unnecessary.

The velocity of reaction of the device is determined by the width of the gap 29, the exactness of the film, the feeding velocity and the sensibility of the photocell. In practice no great requirements are held as to said properties and it is not difficult to build a device which functions very satisfactorily in practice.

The impulse generator can further be provided with an additional photocell by which the electric pump motor is started and stopped respectively. Said cell gives impulses due to a special marking at the start and the end of the film web. Furthermore said cell can control a bell or another signal device which indicates that the impregnation is terminated. By means of an impulse generator according to the invention it is possible to make the whole impregnation process to work completely automatically and the work of the operator at the apparatus can be restricted to the introduction of the wood into the impregnating vessel and its removal after the impregnation and to a general supervision of the apparatus.

The film is suitably produced on photographic way. The dark and light sections then correspond to exposed and unexposed sections respectively. The impregnation program is recalculated to a unit of length suitable for the film. The film is moved through a special exposing apparatus with recording feeding, which enables a simple transferring of the recalculated program to the film. The film is exposed in usual manner. From a master film produced in this way any desired number of copies can be taken.

As will be understood from the foregoing an impregnation program according to the invention includes a great range of variations as to the ratio within the cycle and also as to the duration of the cycle. As to the control of electric machines the problem must be considered very complicated and the conventional controls available in the trade cannot be used in this case.

With an impulse generator according to the invention the difficulties have been concentrated to the film web, where they can be easily overcome. The production of a master film demands a certain manual work, but after this being done the program can be reproduced in form of any desired number of copies. The device can therefore be considered very suitable for this special form of control.

The principle described for the device shown in Figure 7 can be used in different practical embodiments, dependent on the size of the impregnation plant etc.

The valve 8 can be placed on a dome on the highest point of the impregnating vessel whereby to facilitate the outlet of the air out of the impregnating vessel.

Figure 10:
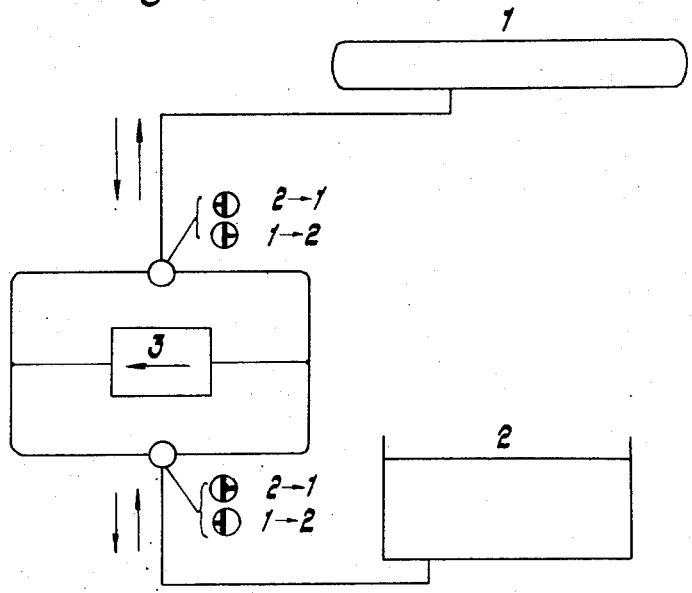
Figure 10 is a modification of the pump means of the apparatus shown in Figure 7.

Instead of a reversible pump (gear pump) pumps having a constant direction of flow (centrifugal pumps, water ring pumps) can be used. The reversing of the liquid flow between the impregnating vessel and the storage tank can then be carried out by means of a valve device, e. g. automatically working three-way cocks (magnet valves) according to Figure 10.

In great plants it can be suitable to divide the functions of the pump devices on two different pumps. Thus, e. g. two centrifugal pumps can be used, whereby the one may serve as suction pump and the other as pressure pump. The pumps are connected in series with the suction pump (low pressure pump) nearest to the impregnating vessel. Preferably the pressure pump is provided with a by-pass line having a magnet valve, said magnet valve being opened when the suction pump works, but closed when the pressure pump works. The pump motors are then working alternatively being controlled by the impulse generator in essentially the same manner as described above. As the load on the electric pump motors and the pumps will be very varying the device can also, to spare the same, be carried out in such a way that the motors are coupled to the pumps over electric magnetic couplings. These are then controlled by the impulse generator and the pump motors are running idly when the pumps do not work.

Furthermore it is of course possible to use separate pumps for the filling and emptying respectively of the impregnating vessel with impregnating liquid.

The device can also be combined with an air pump and a pressure chamber as described in the U. S. Patent No. 2,432,008. In such a plant also full-cell impregnation can be carried out according to the usual vacuum pressure procedure. Further the air pump according to the present method can be used for the pre-treatment of wood with compressed air as described above and for the filling and emptying of the impregnating vessel with impregnating liquid.

In such a case that an impregnating liquid is used, which cannot be mixed with water, the storage tank in Figure 7 can be provided with a water separating means in known manner so that the water that is passing out of the wood can be continously separated from the impregnating liquid.

Having now particularly described and ascertained the nature of my said invention and in which manner the same is to be performed, I declare that what I claim is:

1. A process for impregnating wood in which the wood and the impregnating liquid substantially surrounding it are subjected to pressure changes in a periodical course consisting of cycles, characterized in that each cycle consists of a high pressure stage, during which the pressure of the impregnating liquid is maintained higher than the pressure of the air within the wood, but not higher than about 18 kg/cm.$^2$ absolute pressure, and a low pressure stage, during which the pressure of the impregnating liquid is maintained lower than the pressure of the air within the wood, but not lower than about 0.03 kg/cm.$^2$ absolute pressure; that the changes between the high pressure stages and the low pressure stages are carried out very rapidly and substantially instantaneously; that the length of each cycle is within the range of about 10 seconds to about 10 minutes; that the ratio within each cycle of the length of the high pressure stage to the length of the cycle is from about 10% to about 95%; that the length of each cycle and the ratio within each cycle are successively increased during the impregnation by starting the impregnation with the lowest values and terminating it with the highest values; that the pressure of the air within the wood does not exceed approximately ¼ of said high pressure and is substantially equal to the atmospheric pressure; and that the number of cycles, which states the total duration of the impregnation, is not less than of the order of one hundred.

2. A process as claimed in claim 1, characterized by using wood, the degree of moistness of which being at or above the so-called fibre saturation point, viz. 25–30% moistness and up to 100% or more, that is corresponding to nearly water saturated wood such as timber freshly cut or floated timber.

3. An apparatus for impregnating wood, by means of which wood and impregnating liquid surrounding it are subjected to pressure changes in a periodical course consisting of at least one hundred cycles according to a predetermined program, comprising an impregnating vessel, a storage tank for impregnating liquid, a pipe line connecting said storage tank and said impregnating vessel, pump means inserted in said pipe line capable of pumping in both directions alternatively including two centrifugal pumps coupled in series and arranged to work alternatively, one of said pumps being a low pressure pump inserted nearer to the impregnating vessel than is the other pump and with its inlet connected to the impregnating vessel, and the other one being a high pressure pump with its inlet connected to the storage tank, the latter having a by-pass line with an automatic valve, which opens when the low pressure pump starts, a return pipe line connecting said impregnating vessel and said storage tank, an adjustable pressure control valve inserted in said return pipe line, an automatically working valve mounted on the uppermost portion of the impregnating vessel and arranged to outlet air from said vessel but to prevent air admission from the outside into the vessel and to prevent outlet of impregnating liquid from the vessel, and a program control unit for automatically operating said pump means in accordance with said predetermined program.

4. An apparatus as claimed in claim 3 characterized in that the program control unit includes an endless movable web as a photographic film having transparent (light) and opaque (dark) sections alternating in the direction of movement of the web in accordance with the pressure changes of said program, said web being arranged to pass at least one detecting light-sensitive element, arranged to receive light passing the web.

References Cited in the file of this patent

UNITED STATES PATENTS

| | | |
|---|---|---|
| 1,465,742 | Shipley | Aug. 21, 1923 |
| 1,604,230 | Latimer | Oct. 26, 1926 |
| 1,895,760 | Hunt | Jan. 31, 1933 |
| 1,950,430 | Calcott | Mar. 13, 1934 |
| 2,114,999 | Fickett | Apr. 26, 1938 |
| 2,135,463 | Coolidge | Nov. 1, 1938 |
| 2,210,832 | Bright | Aug. 6, 1940 |
| 2,222,630 | Pickford | Nov. 26, 1940 |
| 2,329,774 | Lefkof | Sept. 21, 1943 |
| 2,350,845 | Vaughan | June 6, 1944 |

FOREIGN PATENTS

| | | |
|---|---|---|
| 17,002 | Great Britain | 1909 |